United States Patent Office 3,428,639
Patented Feb. 18, 1969

3,428,639
PREPARATION OF ERGOT ALKALOIDS
Paul Stadler, Biel-Benken, Basel-Land, and Franz Troxler and Albert Hofmann, Bottmingen, Switzerland, assignors to Sandoz Ltd. (also known as Sandoz A.G.), Basel, Switzerland
No Drawing. Filed Oct. 26, 1966, Ser. No. 589,489
Claims priority, application Switzerland, Nov. 2, 1965, 15,114/65
U.S. Cl. 260—268         2 Claims
Int. Cl. C07d 51/64

ABSTRACT OF THE DISCLOSURE

Ergot alkaloids, e.g., ergotamine, ergostine, etc. are prepared by reaction of 6-methyl-$\Delta^{8,9}$-ergolene-8-carboxylic acid chloride hydrochloride with a 3,6-dioxo-octahydro-oxazolo[3,2-a]pyrrolo[2,1-c]pyrazine salt at temperatures between —20° C. to 30° C. in an inert organic solvent in the presence of an acid binding agent.

The present invention relates to a process for the production of heterocyclic compounds.

The present invention provides a process for the production of compounds of general Formula I,

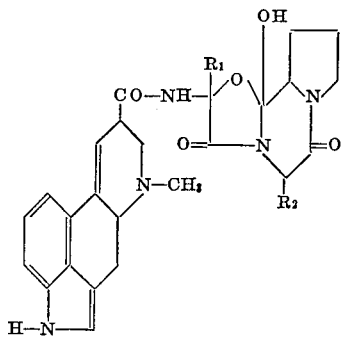

in which
$R_1$ signifies a hydrogen atom or an alkyl radical having from 1 to 4 carbon atoms inclusive, and
$R_2$ signifies an alkyl radical having from 1 to 4 carbon atoms inclusive or benzyl, and their salts with organic or inorganic acids, characterized in that a salt of a compound of general Formula II,

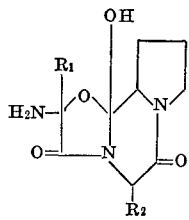

in which $R_1$ and $R_2$ have the above significance, is reacted with 6-methyl-$\Delta^{8,9}$-ergolene-8-carboxylic acid chloride hydrochloride or a mixture of 6-methyl-$\Delta^{8,9}$-ergolene-8-carboxylic acid chloride hydrochloride and d-lysergic acid chloride hydrochloride, at a temperature of —20° to +30° C. in an organic solvent which is inert under the reaction conditions while slowly adding an acid binding agent, and the resulting compound of general Formula I is isolated and purified in manner known per se and then optionally converted into its acid addition salts. A salt of a compound of general Formula II with any desired mineral acid may be used for the reaction.

The process of the invention is preferably effected in that the hydrochloride of a compound of general Formula II and a mixture of 6-methyl-$\Delta^{8,9}$-ergolene-8-carboxylic acid chloride hydrochloride and d-lysergic acid chloride hydrochloride (in which the amount of 6-methyl-$\Delta^{8,9}$-ergolene-8-carboxylic acid chloride hydrochloride preferably does not exceed 60%) are suspended in an organic solvent which is inert under the reaction conditions, e.g. chloroform, methylene chloride, acetonitrile or dimethyl formamide. Pyridine or another tertiary amine is gradually added dropwise to the suspension at a temperature of —20° to +30° C. while cooling and the resulting reaction mixture is kept at the same temperature for ½ to 15 hours. After the reaction has been completed the reaction mixture is diluted with methylene chloride or chloroform and the acid portions are removed by washing first with an aqueous sodium carbonate solution and then with an aqueous common salt solution. The solutions used for the washings are again extracted twice with methylene chloride or chloroform, the combined organic phases are dried and the readily volatile portions are carefully removed in a vacuum.

The resulting compounds of general Formula I are subsequently isolated and purified, e.g. by chromatography and/or crystallization, optionally in the form of their salts. The free bases of general Formula I produced in accordance with the process of the invention may then optionally be converted into their acid addition salts.

A mixture having any desired composition of 6-methyl-$\Delta^{8,9}$-ergolene-8-carboxylic acid chloride hydrochloride and d-lysergic acid chloride hydrochloride may be obtained in that a mixture of any desired composition of 6-methyl-$\Delta^{8,9}$-ergolene-8-carboxylic acid and d-lysergic acid is chlorinated with a chlorinating agent, e.g. phosphorus trichloride or phosphorus pentachloride, in an organic solvent which is inert under the reaction conditions, e.g. chloroform.

The compounds of general Formula I, which have pharmacological activity, e.g. ergotamine, ergosine, ergostine or ergovaline, are known and could hitherto only be produced by reacting reactive functional acid derivatives of d-lysergic acid with salts of compounds of general Formula II. The d-lysergic acid used as starting material for the production of the above reactive functional acid derivatives was obtained by hydrolysis of d-lysergic acid amides which were isolated from culture filtrates of various Claviceps strains.

This process has a number of disadvantages: d-lysergic acid is a compound which crystallizes with relative difficulty and is therefore not readily filterable and undergoes decomposition to a certain extent during the filtering process. Furthermore, d-lysergic acid readily isomerizes to d-isolysergic acid, whereby the yield of d-lysergic acid derivatives in the subsequent reactions is considerably lowered. As the production of d-lysergic acid in the manner described above requires the step of splitting the amide, the resulting d-lysergic acid is a relatively expensive starting material.

In the process of the present invention a mixture of 6-methyl-$\Delta^{8,9}$-ergolene-8-carboxylic acid chloride hydrochloride and d-lysergic acid chloride hydrochloride is preferably used as starting material; this may be obtained as follows:

6-methyl-$\Delta^{8,9}$-ergolene-8-carboxylic acid or a mixture of the same with d-lysergic acid may readily be obtained in a good yield from the culture filtrate of the fungus *Claviceps paspali* Stevens and Hall, specimens of which have been deposited with the United States Department of Agriculture (Northern Utilization Research and Development Division), Peoria, Ill., under the reference NRRL 3080 [H. Kobel, E. Schreier and J. Rutschmann, Helv. chim. Acta., 47, 1052 (1964)]. The resulting crude 6-methyl-$\Delta^{8,9}$-ergolene-8-carboxylic acid containing impurities of d-lysergic acid may be used further as such and without additional expensive separation processes. In contrast to d-lysergic acid it is readily filterable, which property could not be foreseen in view of the structural similarity with d-lysergic acid. Furthermore, 6-methyl-$\Delta^{8,9}$-ergolene-8-carboxylic acid does not isomerize as such to the undesired d-isolysergic acid, but only via d-lysergic acid. The rearrangement of 6-methyl-$\Delta^{8,9}$-ergolene-8-carboxylic acid, of which no iso form exists, to d-lysergic acid may, to a great extent, be avoided by taking the necessary precautions.

The spontaneous, quantitative and irreversible migration of the double bond from the 8,9-position to the 9,10-position of the ergolene structure, occurring during the condensation step of the invention, is surprising since the acid binding agent is added gradually and is immediately used up (3 mols of HCl are set free during the condensation). The conditions under which, according to past experiences [H. Kobel, E. Schreier and J. Rutschmann, Helv. Chim. Acta 47, 1052 (1964)], the above mentioned migration of the double bond may occur, are thus never present during the process of the invention.

From the facts indicated above it may be seen that the process of the present invention permits the production of the compounds of general Formula I, having a high pharmacological activity, from technically readily obtainable starting materials which are considerably more economical than those hitherto used. This results in a considerable lowering of the production costs of the compounds obtained in accordance with the process of the present invention.

The compounds of general Formula II are known or may be produced by known processes.

The compounds of the invention are known medicaments. In particular they have adrenosympathicolytic and uterotonic activity and are therefore, inter alia, indicated for use as oxytocics and for the treatment of migraine.

The compounds I produced in accordance with the invention are crystalline at room temperature; with strong organic or inorganic acids they form stable salts which are crystalline at room temperature. Examples of acids for acid addition salt formation are: inorganic acids, e.g. hydrochloric, hydrobromic or sulphuric acid, or strong organic acids, e.g., oxalic, tartaric or methanesulphonic acid.

The term "in manner known per se" as utilized herein designates methods in use or described in the literature on the subject.

In the following non-limitative examples all temperatures are indicated in degrees centigrade and are uncorrected. The melting points of compounds I, which are usually around 200°, are to be considered more as decomposition points and may vary by some degrees depending on the rate of heating. The melting points were determined in open tubes on a Tottoli melting point apparatus.

EXAMPLE 1

Ergotamine and ergotaminine 1.63 g. of pure 6-methyl-$\Delta^{8,9}$-ergolene-8-carboxylic acid chloride hydrochloride and 1.84 g. of 2-amino-2-methyl-5 - benzyl - 10b - hydroxy - 3,6 - dioxo - octahydro-oxazolo[3,2-a]pyrrolo[2,1-c]pyrazine hydrochloride in 25 ml. of absolute methylene chloride are cooled to $-10°$ and 3.7 ml. of absolute pyridine are added dropwise to this mixture whilst stirring at the same temperature. Stirring is subsequently effected for a further half hour a 0° and then for a further 3 hours at room temperature. Working up is effected by diluting the reaction mixture with methylene chloride and extracting first with an aqueous soda solution and subsequently with an aqueous common salt solution. The aqueous phases are shaken out twice more with methylene chloride, the organic phases are subsequently combined, dried and the solvent carefully distilled off in a vacuum. The amorphous residue is chromatographed on the 30-fold quantity of aluminium oxide, activity I. Ergotaminine is eluted from the column with methylene chloride containing 0.1% of methanol and is recrystallized from methylene chloride/methanol for further purification, whereby slightly yellowish crystals, having a melting point of 229–230° (decomposition) result. On admixture with natural ergotaminine no depression in the melting point was observed. In thin layer chromatography on silica gel and aluminium oxide plates the compound shows a behaviour identical with that of the comparison material. Ultraviolet spectrum in methanol/methylene chloride (1:1): $\lambda_{max.}=312$ m$\mu$, log $\epsilon=3.90$. Infrared spectrum in Nujol suspension: identical with that of the comparison material. $[\alpha]_D^{20}=+372°$ (c.=0.5 in chloroform). Ergotamine is washed from the column with methylene chloride containing 0.3 to 0.5% of methanol and is subsequently recrystallized from dilute acetone, whereby characteristic rectangular crystals, having a melting point of 173–176° (decomposition), are obtained. On admixture with natural ergotamine no depression in the melting point was observed. In thin layer chromatography on silica gel and aluminium oxide plates it shows a behaviour identical with that of the authentic comparison material. After drying the crystals at 80° in a high vacuum (in order to remove the water and acetone of crystallization) the infrared spectrum in Nujol suspension is identical with that of anhydrous ergotamine. Ultraviolet spectrum: $\lambda_{max.}=312$ m$\mu$, log $\epsilon=3.91$ in methanol. $[\alpha]_D^{20}=-152.2°$ (c.=1 in chloroform).

EXAMPLE 2

Ergotaminine and ergotamine (a) Mixture of 6-methyl-$\Delta^{8,9}$-ergolene-8-carboxylic acid chloride hydrochloride and d-lysergic acid chloride hydrochloride.—56 ml. of absolute tetrahydrofuran are placed in a sulphonating flask provided with stirrer, thermometer, dropping funnel and calcium chloride tube, cooling is effected to 0° and 18 ml. of freshly distilled phosphorus trichloride and subsequently 70 ml. of absolute chloroform are added dropwise whilst stirring at 0°. A suspension of 10 g. of a mixture dried in a high vacuum of equal amounts by weight of 6-methyl-$\Delta^{8,9}$-ergolene-8-carboxylic acid and d-lysergic acid in 50 ml. of absolute chloroform is then added, whereby the temperature rises somewhat temporarily. The reaction mixture is again cooled to 0°, a solution of 9.35 g. of freshly sublimated phosphorus pentachloride in a mixture of 24 ml. of phosphorus trichloride and 62 ml. of absolute chloroform is added dropwise at 0° whilst stirring vigorously during the course of 30 minutes and the resulting dark green or dark brown mixture is stirred at 0° for a further 4 hours. In order to crystallize the resulting acid chloride hydrochloride mixture as completely as possible 400 ml. of absolute petroleum ether are added and stirring is effected for a further 15 minutes. Filtration is effected and the residue is washed well with absolute petroleum ether in the absence of air and dried at 20° in a vacuum and then in a high vacuum until a constant weight is obtained. According to the ultraviolet spectrum the resulting dark gray powder is a mixture of d-lysergic acid chloride hydrochloride and 6-methyl-$\Delta^{8,9}$-ergolene-8-carboxylic acid chloride hydrochloride ($\sim$1:1), maxima: at 295 (log $\epsilon=3.73$) and 325 m$\mu$ (log $\epsilon=3.65$) in absolute dimethyl sulphoxide.

(b) Ergotaminine and ergotamine.—Conversion into the peptide alkaloid is effected in that 11.5 g. of the acid chloride hydrochloride mixture obtained in accordance with Example 2(a) and 8.04 g. of 2-amino-2-methyl-5 - benzyl-10b-hydroxy-3,6-dioxooctahydro-oxazolo[3,2-a]pyrrolo[2,1-c]pyrazine hydrochloride are suspended in 105 ml. of absolute methylene chloride, cooling is effected to $-10°$ and 14.7 ml. of absolute pyridine are added dropwise to this mixture whilst stirring at $-10°$.

The reaction mixture is subsequently allowed to react first at 0° for half an hour and then at room temperature for 3 hours. Working up is effected in that 125 ml. of methylene chloride and 22.5 ml. of pyridine are added and stirring is effected for 5 minutes and then 125 ml. of a 2 N soda solution are added and stirring is effected for half an hour. The two-phase mixture is diluted with 500 ml. of methylene chloride, is shaken well and the aqueous phase which has been separated in a separating funnel is extracted four times, each time with 500 ml. of methylene chloride. The methylene chloride solutions are washed again with 125 ml. of common salt solution, dried over sodium sulphate and the solvent is removed in a vacuum. The residue is suspended in toluene, and the solvent is then distilled off in order to remove the pyridine, and the residue is then dried at 80° in a high vacuum. A brown-beige powder is obtained which according to ultraviolet spectrum and thin layer chromatographic analysis consists practically only of ergotamine and ergotaminine. Crystallization from methanol yields practically pure ergotaminine having a melting point of 227–228° (decomposition), $[\alpha]_D^{20} = +367°$ (c.=0.2 in chloroform). By crystallizing once more from methylene chloride/methanol pure ergotaminine is obtained, the physical data of which agree with those indicated in the literature. The combined mother liquors, mainly containing ergotamine, are evaporated to dryness, dissolved in 14 ml. of glacial acetic acid and converted into ergotamine sulphate by adding a solution of 600 mg. of sulphuric acid in 70 ml. of methanol. On inoculating with a trace of authentic ergotamine sulphate crystallization occurs rapidly. The mixture is allowed to stand over night at +5°, filtration is effected, the precipitate is washed with methanol and drying is effected in a high vacuum at 80°, whereby slightly gray coloured, almost pure ergotamine sulphate, having a melting point of 197–198° (decomposition), is obtained in a good yield. On admixture with authentic ergotamine sulphate no depression in the melting point was observed. The base liberated in manner known per se from the sulphate and natural ergotamine are identical in all their properties.

EXAMPLE 3

Ergostine and ergostinine 4.25 g. of pure 6-methyl-Δ⁸,⁹-ergolene-8-carboxylic acid chloride hydrochloride and 3.20 g. of 2-amino - 2 - ethyl - 5-benzyl-10b-hydroxy-3,6-dioxo-octahydrooxazolo[3,2-a]pyrrolo[2,1-c]pyrazine hydrochloride are suspended in 40 ml. of absolute methylene chloride, cooling is effected to −10° and 5.4 ml. of absolute pyridine are added dropwise at −10° whilst stirring. The mixture is further stirred at 0° for half an hour and then at room temperature for 3 hours. Working up is effected in that the viscous, dark-coloured reaction mixture is diluted with 35 ml. of methylene chloride and 8 ml. of pyridine and stirred for 5 minutes. 150 ml. of methylene chloride and 100 ml. of a 2 N soda solution are then added and thorough shaking out is effected. The aqueous phase is again extracted thrice, each time with 150 ml. of methylene chloride, the combined methylene chloride solutions are washed with 40 ml. of common salt solution, dried over sodium sulphate and the solvent removed in a vacuum. A brown foam is obtained from which the individual components are isolated by chromatography on a 30-fold quantity of aluminium oxide, activity I. Ergostinine is washed from the column with methylene chloride containing 0.1% of methanol and is then obtained in the pure form by crystallization from methanol: pointed prisms, having a melting point of 215–216° (decomposition). On admixture with authentic ergostinine no depression in the melting point was observed.

$$[\alpha]_D^{20} = +357°$$

(c.=1 in chloroform). The infrared spectrum, taken in a suspension of Nujol, is identical with that of natural ergostinine. Ergostine is eluted from the column with methylene chloride containing 0.3% of methanol and is further purified by crystallization from ethyl acetate: elongated prisms, having a melting point of 204–205°. On admixture with natural ergostine no depression in the melting point was observed. The infrared spectrum in a suspension of Nujol is identical with that of natural ergostine. $[\alpha]_D^{20} = -168°$ (c.=0.5 in chloroform). Ultraviolet spectrum in methanol: $\lambda_{max.}=311.5$ m$\mu$ (log $\epsilon$=3.97).

What is claimed is:
1. A process for the production of a compound selected from the group consisting of a compound of formula:

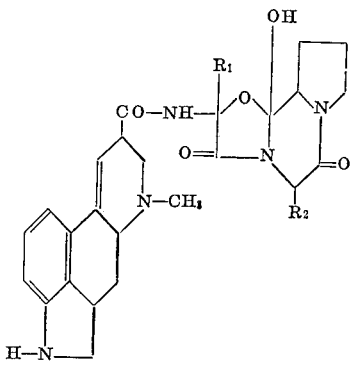

in which $R_1$ is hydrogen or alkyl of 1 to 4 carbon atoms, and $R_2$ is alkyl of 1 to 4 carbon atoms or benzyl, and pharmaceutically acceptable acid addition salts thereof, characterized in that a salt of a compound of formula:

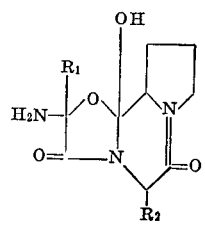

in which $R_1$ and $R_2$ are as above, is reacted with 6-methyl-Δ⁸,⁹-ergolene-8-carboxylic acid chloride hydrochloride or a mixture of 6-methyl-Δ⁸,⁹-ergolene-8-carboxylic acid chloride hydrochloride and d-lysergic acid chloride hydrochloride, at a temperature of −20° to +30° C. in an organic solvent which is inert under the reaction conditions while adding an acid binding agent at a controlled rate at which the binding agent is immediately used up, and, when an acid addition salt is required, the product thus obtained is reacted with an acid.

2. A process according to claim 1, in which, when a mixture of 6-methyl-Δ⁸,⁹-ergolene-8-carboxylic acid chloride hydrochloride and d-lysergic acid chloride hydrochloride is used as starting material, the amount of 6-methyl-Δ⁸,⁹-ergolene-8-carboxylic acid chloride hydrochloride does not exceed 60%.

References Cited

UNITED STATES PATENTS

| 3,084,164 | 4/1963  | Frey            | 260—285.5 |
| 3,280,129 | 10/1966 | Griot           | 260—285.5 |
| 3,314,959 | 4/1967  | Hoffmann et al. | 260—268   |
| 3,314,961 | 4/1967  | Rutschmann et al. | 260—285.5 |
| 3,336,311 | 8/1967  | Hoffmann et al. | 260—268   |

ALEX MAZEL, Primary Examiner.

D. G. DAUS, Assistant Examiner.

U.S. Cl. X.R.

260—285.5